(12) United States Patent
Iizuka et al.

(10) Patent No.: US 9,593,462 B2
(45) Date of Patent: Mar. 14, 2017

(54) CONSTRUCTION MACHINE

(75) Inventors: Kouya Iizuka, Hiratsuka (JP); Takao Nagano, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 13/814,302

(22) PCT Filed: Mar. 26, 2012

(86) PCT No.: PCT/JP2012/057754
§ 371 (c)(1),
(2), (4) Date: May 3, 2013

(87) PCT Pub. No.: WO2012/133308
PCT Pub. Date: Oct. 4, 2012

(65) Prior Publication Data
US 2013/0220720 A1    Aug. 29, 2013

(30) Foreign Application Priority Data
Mar. 31, 2011   (JP) ................. 2011-077596

(51) Int. Cl.
*B60K 6/26* (2007.10)
*B60K 6/30* (2007.10)
(Continued)

(52) U.S. Cl.
CPC ............ *E02F 9/00* (2013.01); *B60K 5/12* (2013.01); *B60K 6/26* (2013.01); *B60K 6/30* (2013.01);
(Continued)

(58) Field of Classification Search
CPC ... B60K 5/08; B60K 6/26; B60K 6/30; B60K 6/40; B60K 6/405; B60K 5/12;
(Continued)

(56) References Cited

U.S. PATENT DOCUMENTS 4,971,171 A * 11/1990 Yamada ................. B60K 11/06
                                                                 123/41.33
5,685,368 A * 11/1997 Yuasa .................... B01D 35/18
                                                                  165/167
(Continued)

FOREIGN PATENT DOCUMENTS

CN    201598667 U    10/2010
CN    101954871 A    1/2011
(Continued)

OTHER PUBLICATIONS

International Search Report of corresponding PCT Application No. PCT/JP2012/057754.
(Continued)

*Primary Examiner* — Frank Vanaman
(74) *Attorney, Agent, or Firm* — Global IP Counselors, LLP

(57) ABSTRACT

A construction machine includes an engine unit, a body frame, and mounting portions. The engine unit includes an engine, a hydraulic pump driven by drive force of the engine, and a generator motor disposed between the engine and the hydraulic pump. The generator motor has a rotary shaft connected to an input shaft of the hydraulic pump and to an output shaft of the engine and a first housing fixed on an engine side and a second housing fixed on a hydraulic pump side. The engine is installed on the body frame. The mounting portions are provided to the engine and to the first housing to support the engine unit on the body frame.

10 Claims, 7 Drawing Sheets

(51) Int. Cl.
*B60K 6/40* (2007.10)
*E02F 9/00* (2006.01)
*B60K 5/12* (2006.01)
*E02F 9/08* (2006.01)
*H02K 7/18* (2006.01)
*E02F 9/22* (2006.01)

(52) U.S. Cl.
CPC .............. *B60K 6/40* (2013.01); *E02F 9/0833* (2013.01); *E02F 9/0866* (2013.01); *E02F 9/22* (2013.01); *H02K 7/1815* (2013.01); *B60Y 2200/412* (2013.01)

(58) Field of Classification Search
CPC ... E02F 9/00; E02F 9/0833; E02F 9/22; E02F 9/0866; H02K 7/1815
USPC ...................... 180/65.26, 291, 292, 296, 299
See application file for complete search history.

(56) References Cited

U.S. PATENT DOCUMENTS

| | | | |
|---|---|---|---|
| 6,470,984 B1* | 10/2002 | Nakajima et al. | 180/65.26 |
| 7,546,693 B1* | 6/2009 | Impellizeri | 33/731 |
| 2001/0015191 A1* | 8/2001 | Kawamoto | F01M 11/03 123/196 R |
| 2004/0098983 A1 | 5/2004 | Naruse et al. | |
| 2007/0265129 A1* | 11/2007 | Kasuya et al. | 475/32 |
| 2008/0072586 A1* | 3/2008 | Hammond et al. | 60/330 |
| 2009/0038580 A1* | 2/2009 | Hamilton | F01M 5/002 123/196 AB |
| 2010/0126791 A1* | 5/2010 | Okada | 180/296 |
| 2011/0000722 A1 | 1/2011 | Kawashima | |
| 2011/0001400 A1* | 1/2011 | Chiba et al. | 310/67 R |
| 2011/0005853 A1* | 1/2011 | Kamiya | 180/296 |
| 2011/0073402 A1* | 3/2011 | Manabe et al. | 180/291 |

FOREIGN PATENT DOCUMENTS

| | | |
|---|---|---|
| JP | 2003-235208 A | 8/2003 |
| JP | 2004-293495 A | 10/2004 |
| JP | 2007-006554 A | 1/2007 |
| JP | 2008-290594 A | 12/2008 |
| KR | 10-2010-0133062 A | 12/2010 |

OTHER PUBLICATIONS

The Chinese Office Action for the corresponding Chinese application No. 201280002081.8, issued on Jun. 4, 2014.

* cited by examiner

CONSTRUCTION MACHINE

CROSS-REFERENCE TO RELATED APPLICATIONS

This application claims priority to Japanese Patent Application No. 2011-077596 filed on Mar. 31, 2011, the disclosure of which is hereby incorporated herein by reference in its entirety.

BACKGROUND OF THE INVENTION

Field of the Invention

The present invention relates to a hybrid construction machine in which an engine, a hydraulic pump, and a generator motor are installed.

Description of the Related Art

So-called hybrid construction machines, in which a generator motor is installed between the engine and a hydraulic pump, have been under development in recent years.

The generator motor installed in a hybrid construction machine is connected to the output shaft of the engine and the input shaft of the hydraulic pump, and generates power from the drive force of the engine. The electrical energy generated by the generator motor is stored in a capacitor or other such electrical storage device, and when the construction machine requires a high engine output, for example, the generator motor is driven by the stored electrical energy and boosts the output of the engine.

For example, Japanese Laid-Open Patent Application 2007-6554 (laid open Jan. 11, 2007) discloses a generator motor configuration in which the housing has an oil pan for holding cooling oil, and oil is uniformly sprayed onto a plurality of coils, which affords efficient cooling.

Japanese Laid-Open Patent Application 2003-235208 (laid open Aug. 22, 2003) discloses a configuration of a generator motor incorporated between an engine and a hydraulic pump.

SUMMARY

However, the following problems were encountered with the above-mentioned conventional construction machine.

With the generator motors disclosed in the above-mentioned publications, the hydraulic pump and the generator motor have to be removed in that order when the engine, the generator motor, or the like requires maintenance. Also, mounting portions that support the engine unit on a body frame are usually provided, two on the engine side and two on the generator motor side. Therefore, when the hydraulic pump has been removed and the generator motor is to be removed, the engine unit must be suspended from a hoist or the like, the mounting portions provided on the generator motor side removed, and the engine unit supported in a separate location on a stand or the like.

Specifically, when engine unit mounting portions are provided on the generator motor side, when the generator motor is to be removed, the mounting portions supporting the engine unit must first be supported in a separate location in a state in which the engine unit is suspended before the generator motor can be removed, and this can make the job of removing the generator motor more difficult.

Also, when the generator motor is removed from the engine, the flywheel and the like that are connected to the output shaft of the engine end up being exposed, so there is the risk that moisture, dust, or the like will adhere to the members on the rotating side, or that the members on the rotating side will be damaged.

It is an object of the present invention to provide a construction machine in which is installed an engine unit in which are integrated an engine, a generator motor, and a hydraulic pump, with said construction machine being designed such that the generator motor is easier to remove.

The construction machine pertaining to the first aspect comprises an engine unit in which are integrated an engine, a hydraulic pump, and a generator motor; a body frame; and mounting portions. The hydraulic pump is driven by the drive force of the engine. The generator motor is provided between the engine and the hydraulic pump and has a rotary shaft connected to the input shaft of the hydraulic pump and to the output shaft of the engine, a first housing fixed on the engine side, and a second housing fixed on the hydraulic pump side. The engine unit is installed on the body frame. The mounting portions are provided to the engine and to the first housing, and support the engine unit on the body frame.

Here, with a hybrid construction machine in which an engine, a hydraulic pump, and a generator motor are installed, an engine unit consisting of an integrated engine, hydraulic pump, and generator motor is disposed on a body frame via mounting portions provided to the engine and the generator motor.

With a hybrid construction machine such as this, when maintenance is to be performed on the engine, the generator motor, etc., first the hydraulic pump and then the generator motor is removed. Usually, the mounting portions that support the engine unit on the body frame are provided two on the engine and two on the generator motor side. Therefore, when the hydraulic pump has been removed and the generator motor is to be removed, the mounting portions provided on the generator motor side have to be supported in a separate location on a stand or the like.

Specifically, when mounting portions of the engine unit are provided on the generator motor side, when the generator motor is to be removed, the mounting portions supporting the engine unit must first be supported in a separate location in a state in which the engine unit is suspended before the generator motor can be removed, and this can make the job more difficult.

With the construction machine of this aspect, the mounting portions provided on the generator motor to support the engine unit are provided on the side of the first housing fixed on the engine side, of the two housings that constitute the outer profile of the generator motor.

Consequently, when the generator motor is to be removed, the mounting portions do not have to be supported in a separate location, and all of the parts of the generator motor other than the first housing can be removed. Thus, the job of remove the generator motor, disassembly work, and so forth can be carried out more easily.

The construction machine pertaining to the second aspect is the construction machine pertaining to the first aspect, wherein the first housing holds a flywheel connected to the engine.

Here, the above-mentioned first housing also functions as a flywheel housing that holds a flywheel connected to the engine.

Consequently, when the generator motor is removed, parts closer to the engine side can be provided inside the first housing and remain fixed on the engine side. Also, since there is no need to separately provide a flywheel housing for holding the flywheel provided between the engine and the generator motor, fewer parts are required and the size of the engine unit in the axial direction can be smaller.

The construction machine pertaining to the third aspect is the construction machine pertaining to the first or second aspect, further comprising an oil pan formed inside the first and second housings.

Here, the oil pan is provided at the lower part of a holding space formed between the first housing fixed on the engine and the second housing fixed on the hydraulic pump side.

Consequently, oil used for cooling and lubricating the parts inside the generator motor can be held in the generator motor.

The construction machine pertaining to the fourth aspect is the construction machine pertaining to the third aspect, further comprising a dipstick tube that is provided to the first housing and that is used to check the level of oil in the oil pan.

Here, the dipstick tube used to check the level of oil in the oil pan formed in the first and second housings is provided on the first housing side.

Consequently, when the generator motor is to be removed or taken apart, there is no need to remove the dipstick tube. Thus, the work is easier than when the dipstick tube is provided on the second housing side.

The construction machine pertaining to the fifth aspect is the construction machine pertaining to any of the first to fourth aspects, wherein the first housing has a thickness that corresponds to the width of the fixed portion where the mounting portions are attached in the rotational axis direction.

Here, the first housing is designed to ensure an adequate width corresponding to the fixed portion of the mounting portions in the rotational axis direction.

Consequently, enough space to attach the mounting portions, the dipstick tube, etc., can be ensured on the first housing side.

The construction machine pertaining to the sixth aspect is the construction machine pertaining to any of the first to fifth aspects, further comprising a muffler that exhausts combustion gas from the engine, and a muffler mounting portion that is provided to the first housing and supports the muffler.

Here, the muffler mounting portion that supports the muffler disposed on the engine is provided on the first housing side.

Consequently, when the generator motor is removed, there is no need to move the muffler mounting portion to somewhere else since the muffler mounting portion is provided on the side of the first housing, which remains on the engine side. Thus, the work of removing the generator motor is made even easier.

The construction machine pertaining to the seventh aspect is the construction machine pertaining to any of the first to sixth aspects, wherein the rotary shaft protrudes toward the engine side from the second housing in a side view.

Here, the rotary shaft of the generator motor is provided so as to protrude toward the engine side from the second housing fixed on the hydraulic pump side, in a side view.

The term "side view" here means a state of being viewed in a direction perpendicular to the rotational axis direction, that is, viewing the rotary shaft from the side.

Consequently, when the generator motor is being attached, and is taken apart between the first and second housings, the rotary shaft protruding from the second housing toward the engine side in side view easily ensures coaxiality with the engine side on which the first housing is fixed.

The construction machine pertaining to the eighth aspect is the construction machine pertaining to any of the first to seventh aspects, wherein said construction machine is a hydraulic excavator.

DESCRIPTION OF THE EMBODIMENTS

A hybrid hydraulic excavator (construction machine) 51 pertaining to an embodiment of the present invention wilt be described through reference to FIGS. 1 to 7.

Hydraulic Excavator 51

Figure 1:
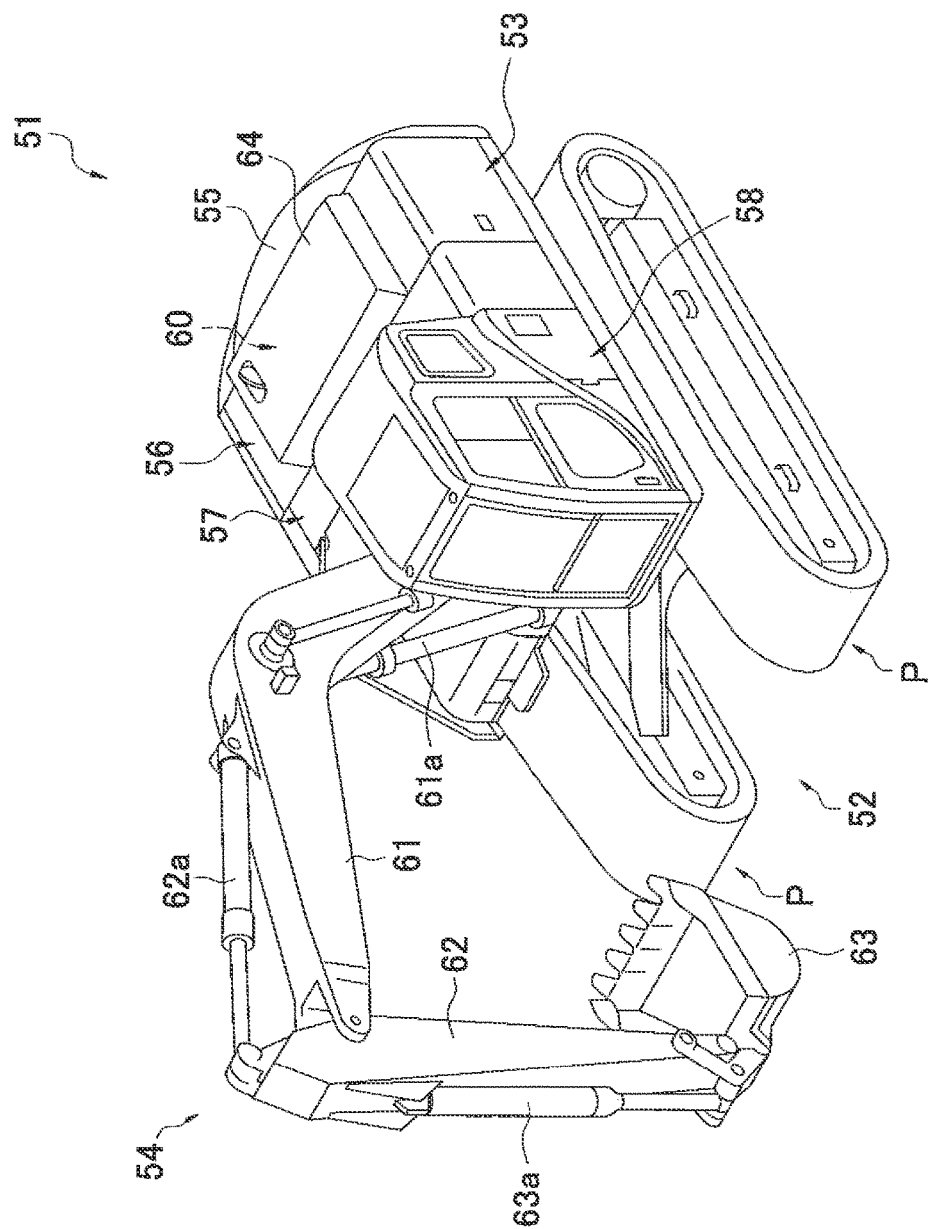
FIG. 1 is an overall oblique view of the configuration of a hydraulic excavator pertaining to an embodiment of the present invention.

As shown in FIG. 1, the hybrid hydraulic excavator 51 pertaining to this embodiment comprises a lower traveling unit 52, a work implement 54, counterweight 55, a machinery bay 56, a body 57, and a cab 58. The hydraulic excavator 51 is equipped with an engine 2 as a drive source. A generator motor 1 and a hydraulic pump 4 that are driven by the engine 2 are serially connected to the output shaft of the engine 2 (see FIG. 2).

The lower traveling unit 52 moves the hydraulic excavator 51 forward and backward by rotating crawler belts P wound around the left and right end portions in the forward direction. A revolving base 53 is installed on the upper face of the lower traveling unit 52.

The revolving base 53 is able to revolve in any direction with respect to the lower traveling unit 52. The work implement 54, the counterweight 55, the machinery bay 56, the body 57, and the cab 58 are installed on the upper face of the revolving base 53. The revolving base 53 is rotated by an electric swing motor driven by power supplied from the generator motor 1 or an electrical storage device. The electric swing motor generates power by regeneration during deceleration of the revolving base, and the electrical energy thus generated is stored in a capacitor.

The work implement 54 is configured to include a boom 61, an arm 62 attached to the distal end of the boom 61, and a bucket 63 attached to the distal end of the arm 62. The work implement 54 performs excavation work in dirt, gravel, or the like at a construction site while moving the boom 61, the arm 62, the bucket 63, etc., up and down with hydraulic cylinders 61a, 62a, 63a, etc., included in a hydraulic circuit (not shown).

The counterweight 55 consists, for example, of a box made of sheet metal and filled with scrap iron, concrete, or the like, and is provided to the rear of the revolving base 53 to balance the body during digging or the like.

As shown in FIG. 1, the machinery bay 56 is disposed adjacent to the counterweight 55, and has an engine compartment 60 that internally holds an engine unit 40 (see FIG. 2) in which the engine 2, the generator motor 1, and the hydraulic pump 4 are integrated in the axial direction, and so forth. The engine compartment 60 is covered by an engine hood 64 that can be opened and closed. The configuration and installation structure of the engine unit 40, etc., installed in the engine compartment 60 will be discussed in detail below. The machinery bay 56 is a space enclosed by a hydraulic fluid tank (not shown), a firewall provided between the engine compartment 60 and the cab 58, openable covers provided on the side faces at the left and right ends of the vehicle, the counterweight 55, the engine hood 64, and so forth. The engine 2, the generator motor 1, and the hydraulic pump 4 are aligned along the counterweight 55 inside the machinery bay 56.

The body 57 is disposed to the rear of the work implement 54, and houses a fuel tank, hydraulic fluid tank, operating valves, and so forth (not shown).

The cab 58 has an interior space in which the operator of the hydraulic excavator 51 rides, and is disposed at the left-front part to the side of the work implement 54 on the revolving base 53 so that the operator can see the end of the work implement 54.

Generator Motor 1

Figure 2:
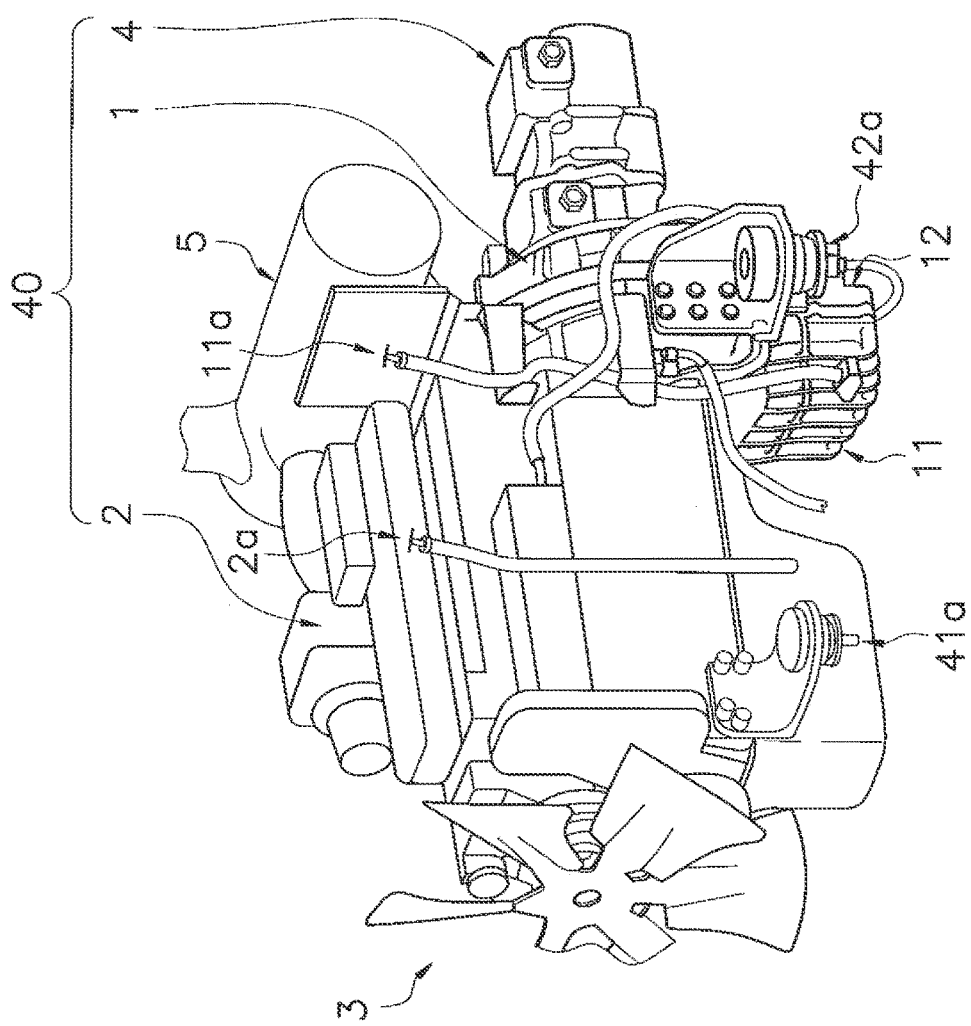
FIG. 2 is an oblique view of the configuration of an engine unit installed in the hydraulic excavator of FIG. 1.

As shown in FIG. 2, the generator motor 1 in this embodiment is installed in the hybrid hydraulic excavator 51, which comprises the engine 2, a cooling fan 3, the hydraulic pump 4, a muffler 5, and so on. The generator motor 1 is disposed between the engine 2 and the hydraulic pump 4. The generator motor 1 is also designed no that a rotary shaft 19 (see FIG. 3) is directly or indirectly connected to the output shaft of the engine 2 and the input shaft of the hydraulic pump 4, and generates power from the rotational drive force of the output shaft of the engine 2. The generator motor 1 is connected to a capacitor via an inverter. When the speed of the engine 2 is increasing (the hydraulic excavator is accelerating), for example, the generator motor 1 is used as needed as an electric motor by means of the electrical energy stored in the capacitor, and assists the rotation of the engine 2. When the engine 2 is idling, the generator motor 1 generates power under the rotational drive force of the engine 2, and the electrical energy thus generated is stored in the capacitor. In this embodiment, the engine 2, the generator motor 1, and the hydraulic pump 4 are disposed in series, and the rotational axes thereof are disposed in a straight line.

Figure 3:
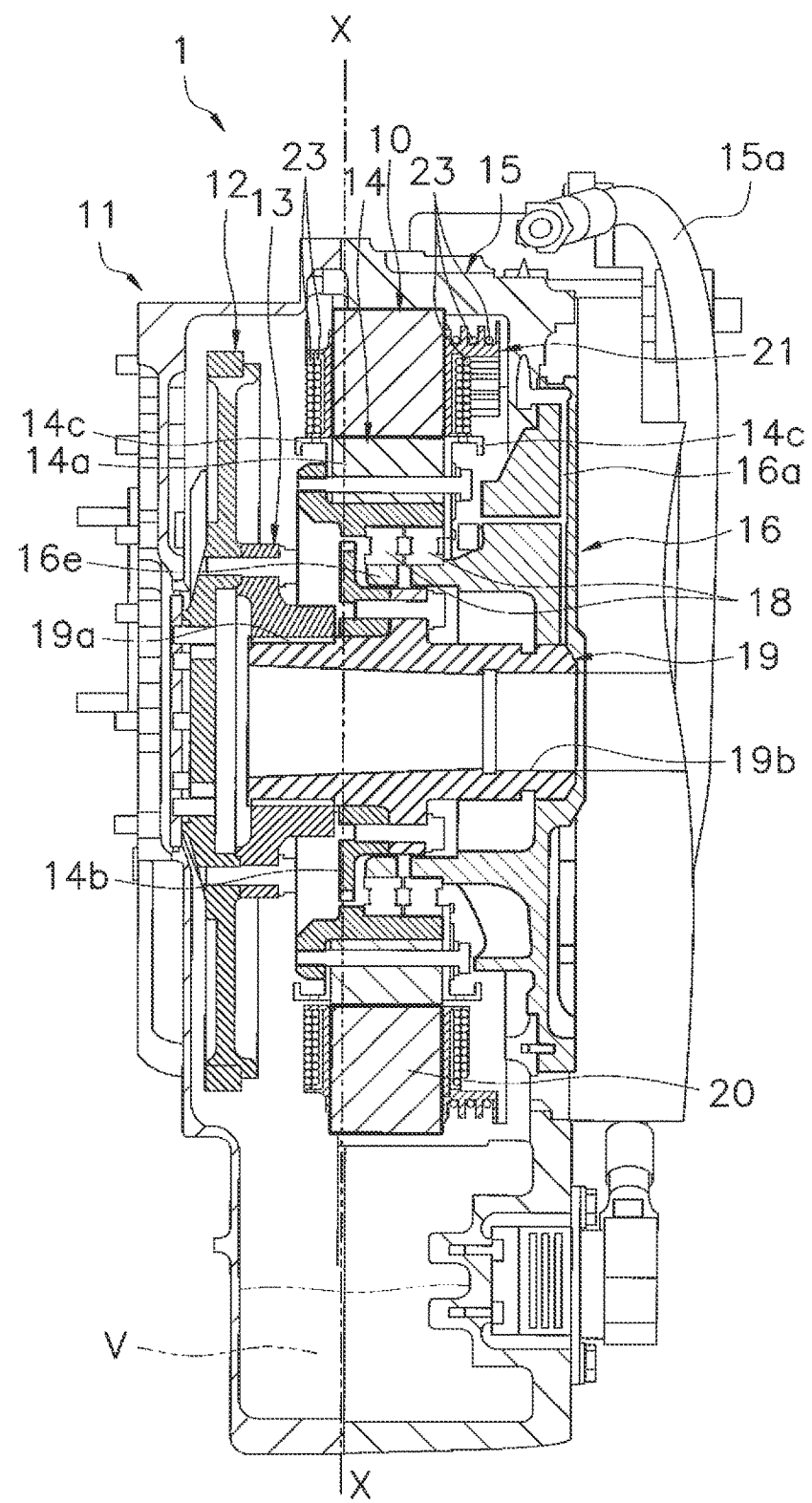
FIG. 3 is a cross section of the configuration of a generator motor included in the engine unit of FIG. 2.
Figure 4:
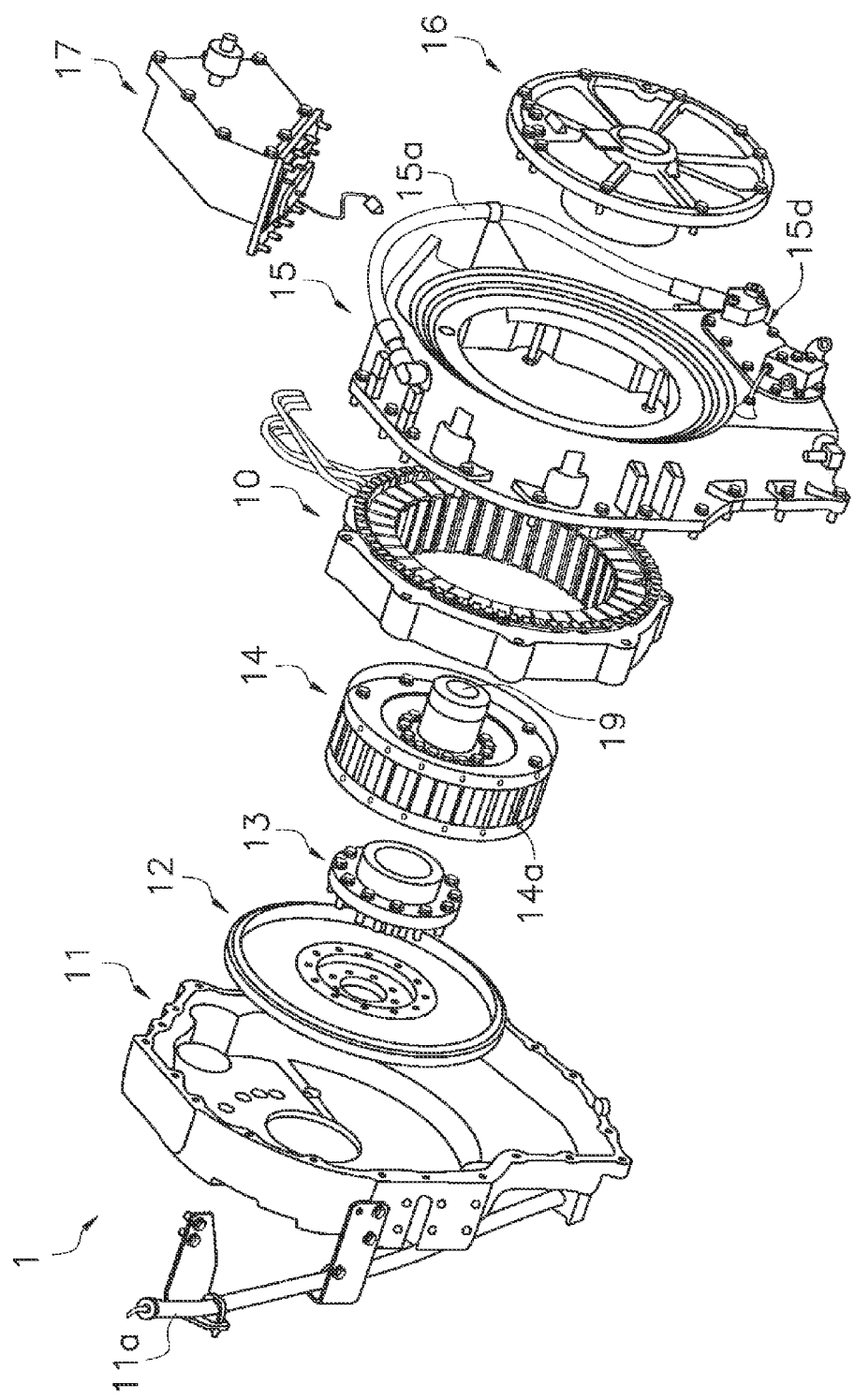
FIG. 4 is an exploded oblique view of the generator motor of FIG. 3.

The generator motor 1 is a 3-phase, 12-pole SR (switched reluctance) motor, and has an oil pan V in its lower part. As shown in FIGS. 3 and 4, the generator motor 1 comprises a stator 10, a first housing 11, a flywheel 12, a coupling 13, a rotor 14, a second housing 15, a flange 16, and the rotary shaft 19.

As shown in FIG. 3, the stator 10 is provided inside a holding space formed within the first and second housings 11 and 15, which make up the outer profile of the generator motor 1. The stator 10 is made up of a circular stator core 20, an insulator 21, coils 23, and so forth.

The stator core 20 is produced by stacking a plurality of steel plates that include a circular yoke portion and stator teeth portions that are disposed along the peripheral direction and protrude at an equal angular spacing inward in the radial direction from the yoke part. In this embodiment, a stator core 20 that includes a total of 36 protrusions is used to configure a 3-phase, 12-pole SR motor.

After the insulator 21 has been mounted to each of the protrusions, the coils 23 are wound.

The first housing 11 is made of cast iron, and as shown in FIG. 3, it is joined with the second housing 15 to form a space that internally holds the stator 10, the rotor 14, and so on. The oil pan V that holds cooling oil for cooling the heat-generating parts of the stator 10 (such as the coils 23) and for lubricating the rotary shaft 19 and a bearing 18 is formed in the lower part of this holding space. Also, as shown in FIG. 4, a dipstick tube 11a (also serves as an oil filler pipe) that is used to check the level of oil in the oil pan V and to refill the oil pan V is connected to the lower end of the first housing 11.

The cooling oil held in the oil pan V inside the first and second housings 11 and 15 is cooled by going through a cooling device (such as an oil cooler 15d (see FIG. 4)) provided to the lower part of the second housing 15, and then goes back into the space inside the first and second housings 11 and 15.

The flywheel 12 is provided on the engine 2 output shaft side within the first and second housings 11 and 15, is connected via the coupling 13 to the rotor 14, and rotates inside the first and second housings 11 and 15.

When the flywheel 12 is housed inside the first and second housings 11 and 15 fixed on the engine 2 side, this reduces the number of parts of the engine unit 40 as compared to a configuration in which a flywheel housing is provided separately, and reduces the size of the engine unit 40 in the axial direction. Thus, with the hybrid hydraulic excavator 51 in which the generator motor 1 is provided between the engine 2 and the hydraulic pump 4, the increase in the size of the engine unit 40 in the axial direction can be kept to a minimum. Consequently, the engine unit 40 can be disposed in a limited space on the revolving base 53.

As shown in FIG. 4, the coupling 13 is a substantially circular member, and is bolted to the flywheel 12. As shown in FIG. 3, the coupling 13 is such that splines formed on the inner radial side mesh with external splines 19a formed on the outer radial side of the rotary shaft 19. Consequently, the flywheel 12 and the coupling 13 rotate along with the rotor 14 around the rotary shaft 19.

As shown in FIG. 3, the rotor 14 is a member on the rotating side, which rotates around the rotary shaft 19, and is inserted into a space on the inner peripheral side of the circular stator 10 in the holding space inside the first and second housings 11 and 15. The rotor 14 has a holder 14b to which a rotor yoke 14a is attached on the outer peripheral side.

The rotor yoke 14a is a structure consisting of a plurality of laminated steel plates (magnetic steel plates), and as shown in FIG. 3, is bolted to the outer peripheral face side of the holder 14b, and has a plurality of inductors (not shown) provided at an equal angular spacing in the peripheral direction on the outer peripheral face side of a circular main body. The rotor yoke 14a is supported so as to be sandwiched by aluminum blades 14c provided on the engine 2 side and the hydraulic pump 4 side. Through-holes that open outward in the radial direction are formed in the outer peripheral faces of the blades 14c. When the rotor 14 rotates, cooling oil is sprayed through these through-holes onto the coils 23 disposed on the outside in the radial direction. These blades 14c need not be provided if the rotor yoke 14a can be supported by recesses formed in the holder 14b, for example.

As shown in FIG. 3, the holder 14b is bolted to the outer peripheral portion of the rotary shaft 19 in a state in which the rotary shaft 19 has been inserted into a center hole. Also, the holder 14b is a steel member having a substantially cylindrical shape, and is a structure in which an inner cylinder is combined with an outer cylinder. The bearing 18 is attached between the outer peripheral face of this inner cylinder and the inner peripheral face of the outer cylinder, and the rotor yoke 14a is attached to the outer peripheral face of the outer cylinder.

The rotary shaft 19 is a cylindrical member that serves as the rotational center of the rotor 14, and has a through-hole that passes from one end to the other in the axial direction. External splines 19a that mate with the internal teeth of the coupling 13 are formed at the end of the rotary shaft 19 on the engine 2 side, and internal splines 19b that mate with the input shaft on the hydraulic pump 4 side are formed at the end on the hydraulic pump 4 side. The rotary shaft 19 is fixed in a state in which the half on the hydraulic pump 4 side in the axial direction is inserted on the inner peripheral face side of the inner cylinder of the flange 16. As shown in FIG. 3, the rotary shaft 19 is disposed so as to protrude from the end face of the second housing 15 (the X-X line in FIG. 3) toward the engine 2 side (the left side in the drawing) in a lateral cross sectional view.

The second housing 15 is a cast iron member, and as shown in FIG. 3, is provided on the hydraulic pump 4 side of the generator motor 1, and along with the first housing 11 forms a holding spacing for holding the flywheel 12, the coupling 13, the rotor 14, the stator 10, and the rotary shaft 19. The second housing 15 has an oil cooler 15d for cooling the cooling oil. The outlet of the oil cooler 15d is connected to a cooling oil pipe 15a for sending cooling oil up to the upper part inside the first and second housings 11 and 15. An electrical box 17 connected to the wiring, etc., of the coils 23 wound around the protrusions of the stator core 20 via the insulator 21 is attached to the shoulder of the second housing 15 as shown in FIG. 4.

The cooling oil held in the oil pan V goes through a pipe (not shown), a filter (not shown), and a circulation pump and is supplied to the inlet of the oil cooler 15d provided at the lower part of the second housing 15. The cooling oil pipe 15a connected to the outlet of the oil cooler 15d is connected to the upper part of the second housing 15 in order to supply cooling oil scooped up from the oil pan V to the upper part of the space formed inside the first and second housings 11 and 15.

As shown in FIG. 3, the flange 16 is a disk-shaped member disposed coaxially with the rotary shaft 19, and in its interior is formed a cooling oil path 16a that guides to the desired portions the cooling oil sent through the cooling oil pipe 15a to the upper part of the second housing 15. The flange 16 is fixed by a plurality of bolts to the hydraulic pump 4 side of the second housing 15. The flange 16 has a substantially cylindrical bearing support 16e that protrudes in the axial direction from a substantially disk-shaped face. The bearing support 16e supports the bearing 18 on the substantially cylindrical outer peripheral face side.

The cooling oil path 16a supplies cooling oil that has flowed from the upper space inside the first and second housings 11 and 15, to the bearing 18, splines (joining components), and so forth in contact with the members on the stationary side and with the rotor 14 and the rotary shaft 19. Consequently, a sufficient quantity of lubricating oil (cooling oil) is supplied at all times to the bearing 18, splines (joining components), and so forth.

Installation Structure of Engine Unit 40

Figure 6:
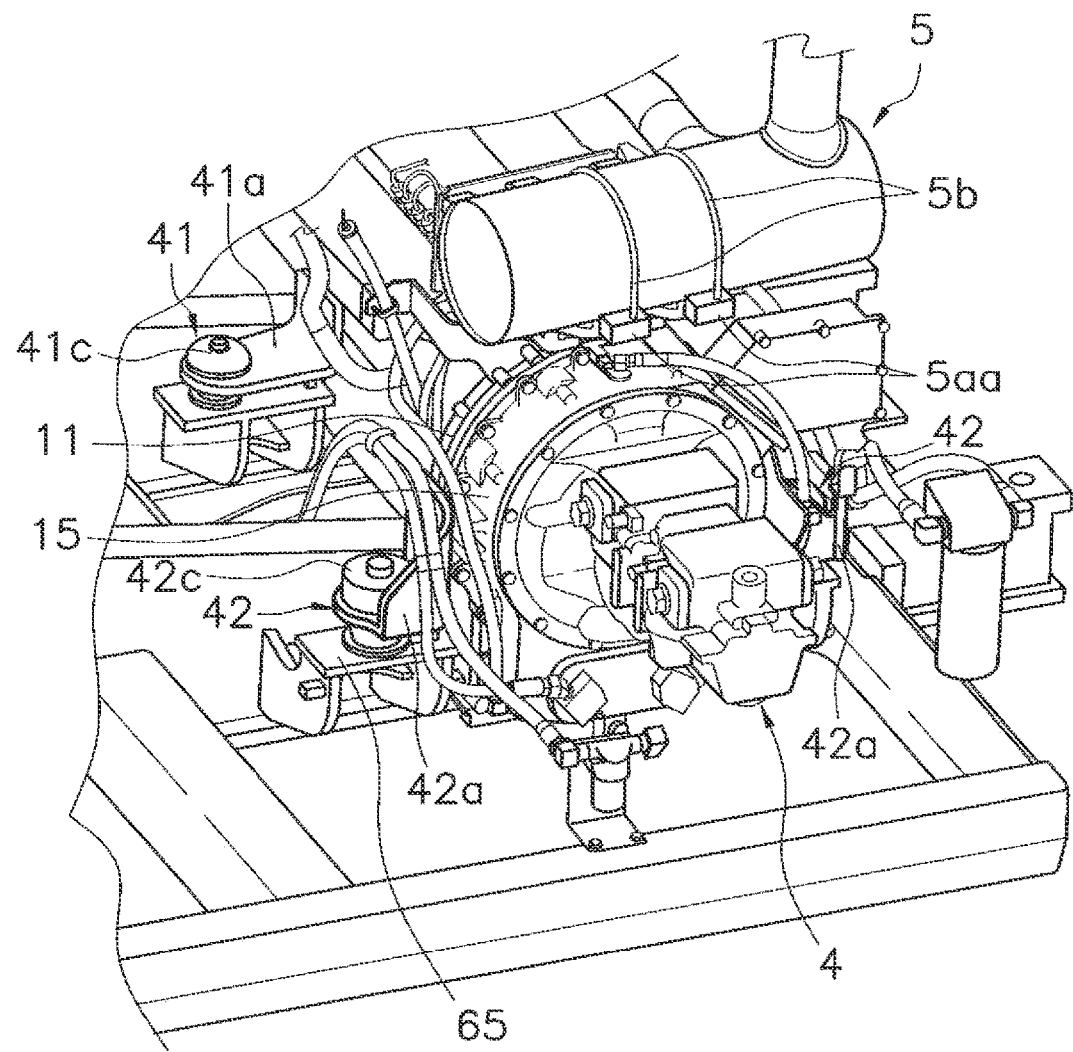
FIG. 6 is an oblique view of a state in which the engine unit of FIG. 2 has been installed on a body frame.

As shown in FIG. 6, with the hydraulic excavator 51 in this embodiment, the engine unit 40 including the engine 2, the generator motor 1, and the hydraulic pump 4 is supported on a body frame 65 at four points including mounting portions 41 and 42.

More specifically, as show in FIG. 6, the engine unit 40 is supported on the body frame 65 at four points: a pair of mounting portions 41 attached to the engine 2, and a pair of mounting portions 42 attached to the first housing 11 of the generator motor 1.

The mounting portions 41 are fixed to the side face of the engine 2, and support the engine 2 side of the engine unit 40 on the body frame 65. The mounting portions 41 each have a main body part 41a and a support member 41c.

The main body parts 41a are substantially L-shaped members, and are fixed to the side face of the engine 2. The support members 41e are made of rubber or another such elastic material, are fitted into openings formed in the horizontal faces of the substantially L-shaped main body parts 41a, and support the engine 2 side of the engine unit 40 on the body frame 65.

Figure 5:
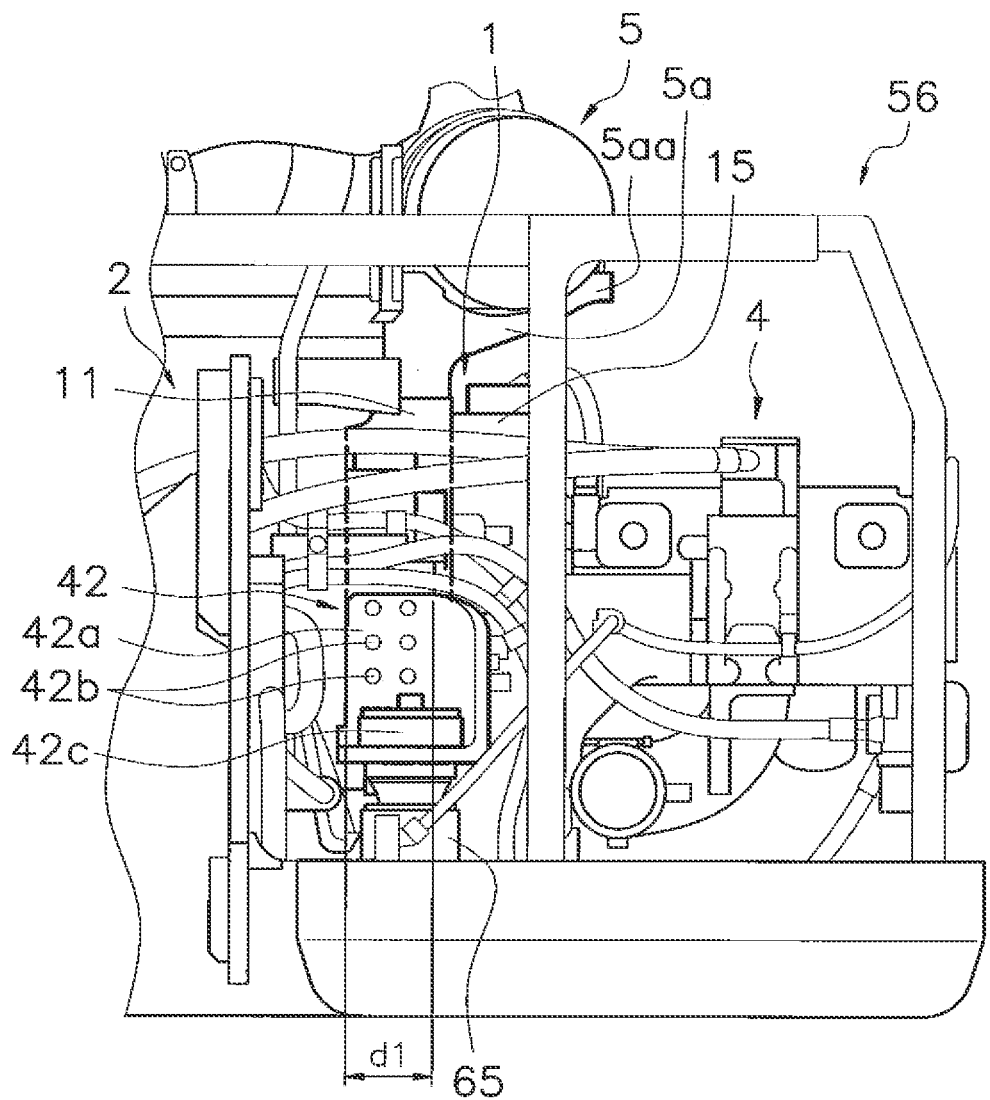
FIG. 5 is a side view of a state in which the engine unit of FIG. 2 has been installed on a body frame.

The mounting portions 42 are fixed to the side face of the first housing 11 of the generator motor 1, and support the hydraulic pump 4 side of the engine unit 40 on the body frame 65. As shown in FIG. 5, the mounting portions 42 each have a main body part 42a, a plurality of bolts 42b, and a support member 42c.

As shown in FIG. 5, the main body parts 42a are in the form of a box produced by joining three planes, with one of these planes being fixed by the bolts 42b to the side face of the first housing 11. The support members 42c are made of rubber or another such elastic material, are fitted into openings formed in the horizontal faces of the box-shaped main body parts 42a, and support the hydraulic pump 4 side of the engine unit 40 on the body frame 65.

The vertical faces of the main body parts 42a of the mounting portions 42 here are fixed to the side face of the first housing 11 by the bolts 42b. Therefore, the thickness of the first housing 11 in the axial direction is slightly greater than the width d1 of the fixed portion of the mounting portions 42, as shown in FIG. 5. Consequently, enough surface area can be ensured on the side face of the first housing 11 to attach the mounting portions 42. The thickness of the first housing 11 in the axial direction should allow the flywheel 12 to be enclosed and afford the width d1 of the fixed portion of the mounting portions 42.

Also, with the hydraulic excavator 51 in this embodiment, the muffler 5 is disposed at the upper part of the engine unit 40.

As shown in FIG. 6, the muffler 5 is fixed on the first housing 11 of the generator motor 1 via a muffler mounting portion 5a that supports the muffler 5. More precisely, the muffler 5 is fixed on the muffler mounting portion 5a by wires 5b wound around the outer peripheral face of the muffler 5.

The muffler mounting portion 5a is a seat for supporting the muffler 5, and is fixed on the first housing 11 of the generator motor 1.

The wires 5b are fixed at one end to fixing components 5aa protruding toward the hydraulic pump 4 side from part of the muffler mounting portion 5a, and are wound around the outer peripheral face of the muffler 5.

Removing the Engine Unit 40

With the hydraulic excavator 51 in this embodiment, the following procedure is carried out when disassembly work is performed during maintenance of the above-mentioned engine 2, generator motor 1, etc.

For example, when maintenance is performed on the generator motor 1, first it is removed from the hydraulic pump 4, which is disposed near an openable door provided to the side face of the body 57.

Next, the first and second housings 11 and 15 are unfastened from each other, and the generator motor 1 is taken apart at the first housing 11 on the engine 2 side and the second housing 15 on the hydraulic pump 4 side. This allows repair or maintenance to be performed on the parts that make up the stator 10, the rotor 14, and so on in the generator motor 1.

Of the constituent members of the generator motor 1, the stator 10, the rotor 14, the flange 16, the rotary shaft 19, and so forth are included on the second housing 15 side that is removed. Conversely, of the constituent members of the generator motor 1, the flywheel 12, the coupling 13, and so forth are included on the first housing 11 side that remains fixed to the engine 2 side. Since the flywheel 12 is enclosed in the first housing 11 here, when the second housing 15 has been removed, no moisture, dust, or other foreign matter will stick to the members on the rotation side, such as the flywheel 12 or the output shaft of the engine 2, nor will these members be damaged.

The mounting portions 42 that support the engine unit 40 (including the generator motor 1), the dipstick tube 11a, and the muffler mounting portion 5a are attached to the first housing 11 that remains on the engine 2 side.

Consequently, when the generator motor 1 is taken apart, there is no need to support the mounting portions 42 on a stand or the like in a separate location in a state in which the engine unit 40 is suspended from a hoist or the like, and instead the parts on the second housing 15 side can be directly removed to take apart the generator motor 1. Thus, the work entailed by disassembly of the generator motor 1 is easier.

Figure 7:
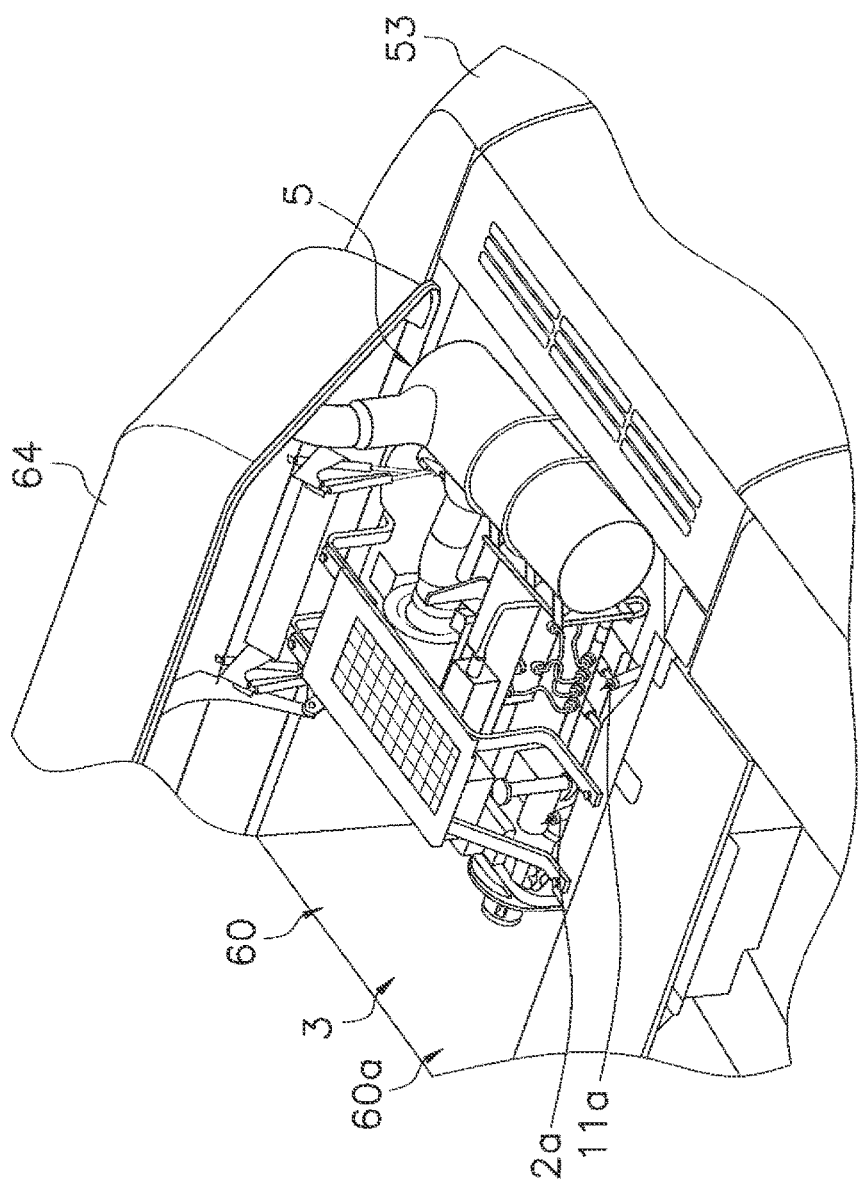
FIG. 7 is an oblique view of a state in which the engine hood of the hydraulic excavator in FIG. 1 has been opened.

Also, since the dipstick tube 11a used for checking the level of oil in the oil pan V formed in the first and second housings 11 and 15 is also provided on the first housing 11 side, there is no need to remove the dipstick tube 11a during disassembly of the generator motor 1, which makes the work easier. As shown in FIG. 7, in this embodiment the dipstick tube 11a is routed to an upper opening 60a of the engine compartment 60, which is exposed when the engine hood 64 is opened. Therefore, when the engine hood 64 is opened to check the oil level of the engine 2 with an engine dipstick tube 2a, the oil level inside the generator motor 1 can also be checked at the same time with the dipstick tube 11a, and this makes the job of checking easier. The engine dipstick tube 2a and the dipstick tube 11a of the generator motor 1 are preferably provided on the same side, rather than being installed on the left and right sides or the front and rear of the vehicle, for example. This makes the work easier in checking the oil level of the engine 2 and the oil level of the generator motor 1.

Furthermore, since the muffler mounting portion 5a that supports the muffler 5 disposed on the engine 2 is also fixed to the first housing 11, there is no need for the muffler 5 to be suspended, etc., with a hoist or the like during disassembly of the generator motor 1, which also makes the work easier.

With the hydraulic excavator 51 in this embodiment, as discussed above, and as shown in FIG. 3, the rotary shaft 19 is provided so as to protrude from the end face of the second housing 15 toward the engine 2 side in a lateral cross section of the generator motor 1.

Consequently, when the generator motor 1 is taken apart, the rotary shaft 19 included on the second housing 15 side protrudes from the second housing 15. Thus, when the generator motor 1 is reassembled after internal maintenance or the like, the rotary shaft 19 can be inserted into the center hole of the coupling 13 on the first housing 11 side before the end of the stator 10 or the rotor 14 hits the first housing 11 side. As a result, by inserting the rotary shaft 19 into the center hole of the coupling 13, the parts on the first housing 11 side and the parts on the second housing 15 side can be aligned in the radial direction without causing any damage or the like to the parts.

The stator core 20 is preferably enclosed on the flange 16 side from the end face on the second housing 15 side (the X-X line in FIG. 3). Similarly, the rotor 14 is also preferably enclosed. Doing this prevents damage to the core portions of the rotor 14 and the stator core 20, which are important parts of the generator motor 1. It also maintains a precise gap between the stator core 20 and the rotor 14.

Other Embodiments

An embodiment of the present invention was described above, but the present invention is not limited to or by the above embodiment, and various modifications are possible without departing from the gist of the invention.

(A) In the above embodiment, an example was given in which the present invention was applied to a hydraulic excavator, but the present invention is not limited to this.

For example, the present invention can be similarly applied to another hybrid construction machine, such as a wheel loader.

(B) In the above embodiment, an example was given in which an SR (switched reluctance) motor was used as the generator motor 1, but the present invention is not limited to this.

For example, a PM (Permanent Magnet) motor or other such generator motor may be used.

The construction machine of the illustrated embodiment is equipped with an engine unit in which an engine, a generator motor, and a hydraulic pump are integrated, and has the effect of making the work easier in attaching and removing the generator motor. Therefore, the construction machine according to the illustrated embodiment can be widely applied to hybrid construction machines in which a generator motor is installed between the engine and a hydraulic pump.

The invention claimed is:
1. A construction machine comprising:
an engine unit including an engine, a hydraulic pump driven by drive force of the engine, and a generator motor disposed between the engine and the hydraulic pump, the generator motor having a rotary shaft connected to an input shaft of the hydraulic pump and to an output shaft of the engine and a first housing fixed on an engine side and a second housing fixed on a hydraulic pump side, the generator motor further including a rotor and a stator mounted to the second housing such that the rotor and the stator are removed with the second housing when the second housing is disconnected from the first housing, a majority of each of the stator and the rotor being disposed within the second housing when the second housing is connected to the first housing;

a body frame on which the engine unit is installed;

mounting portions provided to the engine and to the first housing to support the engine unit on the body frame; the mounting portions being provided to the first housing without being provided to the second housing;

a flange portion fixed to the second housing to support the rotor via a bearing, an oil path being formed in the flange portion to supply oil to the bearing; and an oil cooler that is fixed to the second housing and removed with the second housing when the second housing is disconnected from the first housing.

2. The construction machine according to claim 1, wherein
the first housing holds a flywheel connected to the engine.

3. The construction machine according to claim 1, further comprising
an oil pan formed inside the first and second housings.

4. The construction machine according to claim 3, further comprising
a dipstick tube that is provided to the first housing and that is used to check a level of oil in the oil pan.

5. The construction machine according to claim 1, wherein
the first housing has a thickness that corresponds to a width of a fixed portion where the mounting portions are attached in a rotational axis direction.

6. The construction machine according to claim 1, further comprising:
a muffler that exhausts combustion gas from the engine; and
a muffler mounting portion provided to the first housing to support the muffler.

7. The construction machine according to claim 1, wherein
the rotary shaft protrudes toward the engine side from the second housing in a side view.

8. The construction machine according to claim 1, wherein
the construction machine is a hydraulic excavator.

9. The construction machine according to claim 1, wherein
an oil cooling pipe supplies cooling oil from the oil cooler to the oil path.

10. The construction machine according to claim 1, wherein
an oil pan is formed between the first and second housings, the oil pan supplying oil to the oil cooler.

* * * * *